May 8, 1934.  G. E. PELTON  1,957,611
ARTICLE OF MANUFACTURE AND PROCESS OF COATING ABSORBENT BASE MATERIALS
Filed Feb. 6, 1929  3 Sheets-Sheet 1

INVENTOR.
George E. Pelton
by Parker & Prochnow
ATTORNEYS.

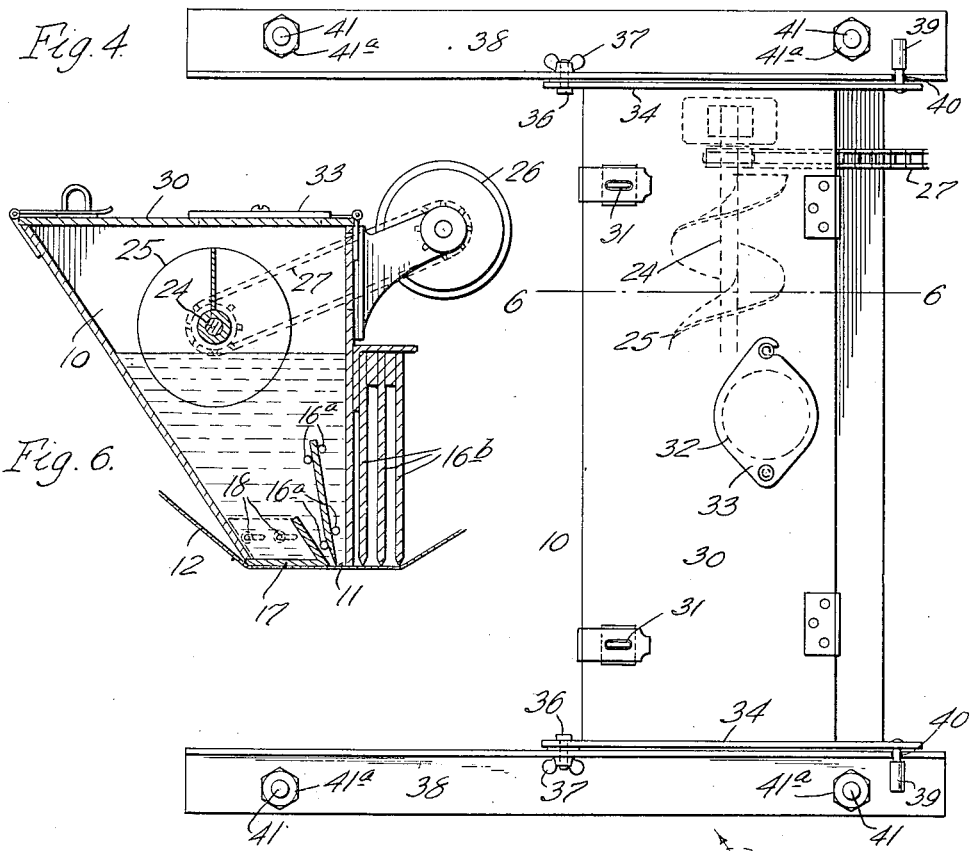
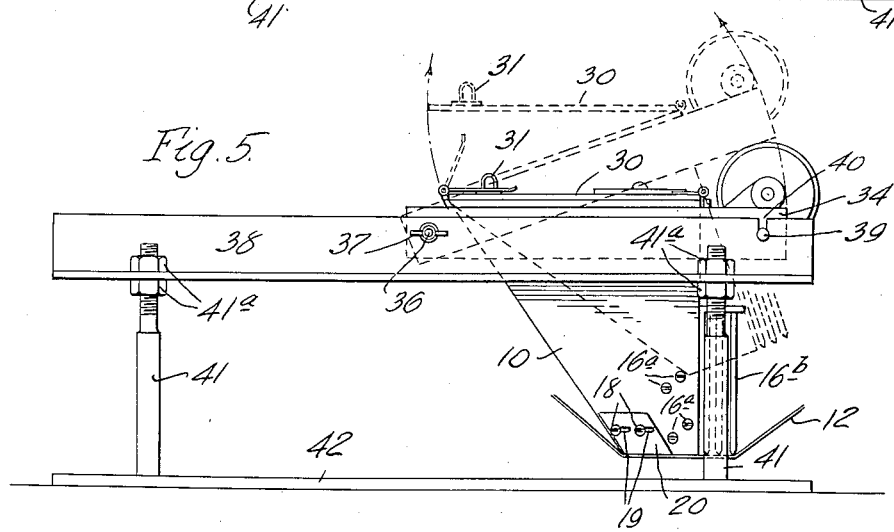

May 8, 1934.   G. E. PELTON   1,957,611
ARTICLE OF MANUFACTURE AND PROCESS OF COATING ABSORBENT BASE MATERIALS
Filed Feb. 6, 1929    3 Sheets-Sheet 3

INVENTOR
George E. Pelton
by Parker & Prochnow
ATTORNEYS

Patented May 8, 1934

1,957,611

UNITED STATES PATENT OFFICE 1,957,611

ARTICLE OF MANUFACTURE AND PROCESS OF COATING ABSORBENT BASE MATERIALS

George E. Pelton, Kenmore, N. Y.

Application February 6, 1929, Serial No. 337,820

42 Claims. (Cl. 91—70)

This invention relates generally to surface coated, absorbent materials and to the processes of producing them. Briefly, the process has to do with the formation of a thin layer or superficial film on surfaces of highly absorbent, dry base materials such as the various kinds of base materials of my copending application, Serial No. 267,089, filed April 3, 1928, and other base materials that are absorbent for other purposes. For convenience of illustration only, the invention will be described more particularly with relation to typing machines or printing machines. Such expressions as typewriter or ribbon are to be given a broad interpretation wherever hereinafter used. The word ribbon does not always mean an ink transfer member for it may mean a ribbon that is used for an entirely different purpose without any ink. Webs are not limited to the wide fabric and paper and other fibrous base materials mentioned in said copending application, but may mean a very long ribbon which is feeding from a supply roll.

For long years the base materials of ink transfer members have been dry and highly absorbent as prepared for their inking. All substances that can impair their absorbency have been removed. In taking such base materials as mentioned in said copending application, I am, therefore, illustrating my process by putting it to an extremely severe test. For the films of said application I must place on the surface of an absorbent base material a material that positively will not materially impair the absorbency of said base and that will not reduce materially the amount of ink it can later absorb in accordance with said copending application. As stated in said application, the base materials for ink transfer members are tight, compact and formed of very close fibres of any kind that are capable of absorbing ink and giving off ink. I may use paper, silk, spun silk, cotton, linen, wool, any absorbent fibre. The discovery of the present method of placing a thin film on the surface of such absorbent materials without appreciably impairing their absorbency makes it possible to greatly increase the efficiency of ink transfer members generally and in any form. Until the discovery of the present process there was no known means of efficiently distributing the ink supply of a transfer member or of feeding the contained ink out under control to derive the most complete benefit of said ink, which means to have even, neat impressions for the substantial life of the ribbon or other transfer member, all as set forth at greater length in said application. By reason of this present process, which is not restricted to ink members, the performances described in said application as to quantity of writing, uniformity and neatness of impressions month after month from the same ribbon or member, as well as the greatly increased wear resistance and durability of the base itself, are made a reality for the first time since typewriters were invented.

In said application are disclosed various base materials provided on one surface thereof with an ink-retarding film which serves as a screen or filter on the side of the member towards the writing surface. This is formed of cellulose nitrate and in said application are set forth various pyroxylin and other mixtures used for producing this ink-retarding film which is pervious or permeable to ink and through which the ink contained in the body portion of the absorbent base is forced by the pressure or blows of the type in making impressions in the use of a machine, the purpose of the ink-retarding agent being set forth in greater detail in said application.

One object of the present invention is to provide an efficient process whereby an absorbent base adapted for use as an ink retarding or coated ink member, or for any other purpose, may be provided on its surface with an extremely thin, overlying or superficial, first layer or film or coating, which, thin though it has to be, will be absolutely uniform throughout and free from uncoated spaces and streaks and spots and from even minute defects; also to provide a method of high accuracy and precision whereby the said layer or film can be economically and rapidly applied as an overlying, surface film on the surface of a wide, absorbent base in the form of a continuous sheet or web, or band, or ribbon or other form, with perfect uniformity and evenness of coating, free from any blemish of any character which might cause imperfect results later in its use; for example, a very slight imperfection would cause ink being fed from a base such as described in said copending application which is only .002 of an inch thick to be blurred and illegible and might spoil a page of writing and cause the entire ink member to be thrown away as defective and of no value. For such ink-retarding films as required to produce the coated ink transfer members of said copending application, a very high degree of precision and accuracy of coating work is required. As explained in said application, some of the base materials are of expensive silk and spun silk fabrics specially woven of a large number of threads, tight and compact, so that they may absorb a very large amount of ink. As stated in said application spun silk is ideal material for use with this process because of the high degree of absorbency of the fibres and also because the coating material readily adheres to the surface without penetrating or saturating the fabric appreciably.

One of the objects of the present invention is to provide a method and means for applying the first coat and the successive coats with practically no penetration of the body of the base material and without impairing the absorbency of the base materially; also to provide a method and means for applying the first extremely thin coat and then quickly augmenting and building up a film of any desired thickness and character; also to provide a method of precision and accuracy by which the second and successive coats can be thicker than the first coat without injury or impairment of the absorbency of the base material appreciably or materially; also to provide a method of precision and accuracy by which first coats can be applied to various kinds of absorbent base materials such as those of the copending application in the form of such extremely thin, diaphanous films as to be almost infinitely thin. For such first coats I may use a speed of travel of several hundred feet per minute and a surface contact of only one-eighth of an inch. As shown in the following description of the drawings and in the drawings themselves, I coat and dry in such rapid succession for the finest, thinnest first coats as to be almost instantaneous.

To enable others skilled in the art to fully comprehend the features thereof, drawings have been annexed as a part of this disclosure of my invention.

In the accompanying drawings:

Fig. 4 is a plan view, on an enlarged scale, of the container shown in Fig. 1, and its supporting means.

Fig. 5 is a side elevation thereof, showing in full lines the parts in operative position, and showing in broken lines the container tilted to an inoperative position.

Fig. 6 is a longitudinal, vertical section, on an enlarged scale, of the container, on line 6—6, Fig. 4.

Figure 1:
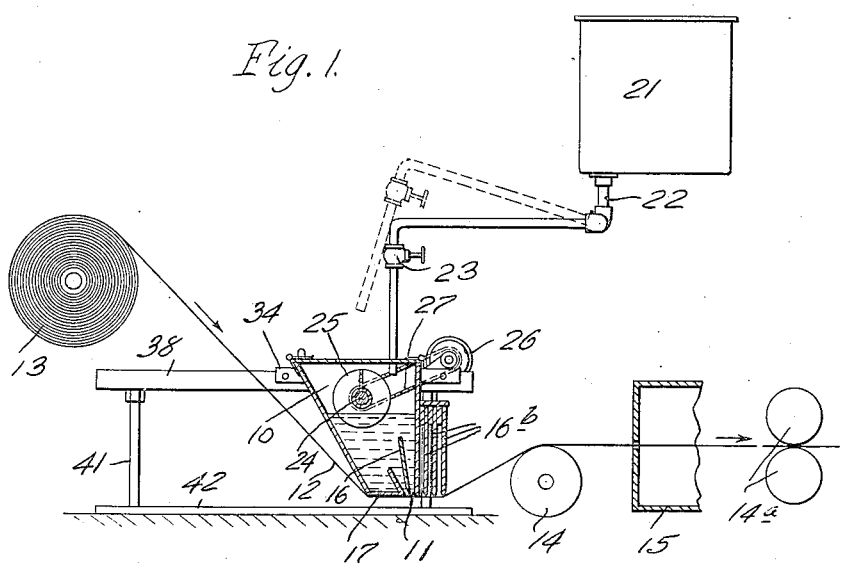
Fig. 1 is a more or less diagrammatic sectional elevation of one form of apparatus embodying my invention and adapted to carry out my method of applying coatings to absorbent materials.

Referring first to Figs. 1, 4 and 6 of the drawings, 10 represents a container or receptacle for the coating material and past which the base to be coated is moved for applying the coating thereto. This container is provided with a discharge opening 11, preferably extending from end to end of the bottom of the container and through which the coating material is adapted to contact with the surface of the base being coated, as the latter is moved across the discharge opening. The travelling base 12 is held against the edges of the discharge opening 11 so that the coating material will contact with and be applied to the surface of the web as the latter moves past the opening, but so that the base will prevent the escape of the coating material from the container except only as it is carried away by adhering to the surface of the base. The base can be held against the edges of the discharge opening so as to effect this result in different ways, for instance, as shown in Fig. 1, the base 12 is drawn from a supply roll 13, thence across the discharge opening 11 of the container and over a guide roller 14, and the supply roller 13 and roller 14 are so disposed and the base is pulled forward under such tension by the rolls as to cause the base to be drawn taut over and in contact with the edges of the discharge opening 11. The base may be propelled by suitable means, such as driven feed rolls 14a disposed near the outlet end of a drying or evaporating chamber 15 through which the base is drawn rapidly for evaporating the solvent of the coating material and drying said coating material and the base. For the finest results for the first coat, I may operate said rolls at a speed of several hundred feet per minute, pulling the material past the coating station and through the drying or evaporating chamber as one continuous operation at even, uniform speed as indicated in the said Fig. 1, and in the above description.

16 represents a scraper or blade for spreading the coating material evenly and thinly over the surface of the base. As shown in Fig. 1, this scraper is supported within the container 10 with its lower, thin or knife edge extending through the discharge opening 11 so as to bear upon and scrape over the upper surface of the base as the same travels past the scraper. The scraper may be held in position in the container or receptacle by any suitable means, such for instance as studs or pins 16a projecting from the opposite end walls of the container, the studs or pins being disposed so as to embrace and firmly hold the opposite side edges of the scraper.

The coating material in the container is in a semi-liquid or viscous condition about the viscosity of the mixture required for producing some of the pyroxylin films mentioned in the copending application and said mixture is hereinafter disclosed in detail as given therein. The thickness of the coating film on the base and its penetration of the fabric is determined more or less by the width of the discharge opening 11 in the container and the speed at which the base travels across the discharge opening. Thus, by having the discharge opening for the coating material relatively narrow and causing the base to travel across the opening at a relatively high speed, the period of contact of the coating material with the base will be relatively short, and only an extremely thin overlying layer or superficial, diaphanous film of the coating material will adhere to the base and this film will be uniformly spread and laid over the surface of the base by the scraper 16. It is desirable and of the greatest importance in making the coated webs or ribbons disclosed in my said copending application to prevent the coating material from appreciably penetrating or impregnating the fabric or other base material. In its first passage through the coating apparatus, it is necessary and absolutely important to form only an extremely thin, overlying layer or superficial surface film which consists of a very slight deposit of material which does not penetrate into the body portion of the base materially or appreciably and which is of too slight an amount to do harm. The big, important point is to apply the first coat so it cannot impair the absorbency of the base appreciably and by repeated operations and without stopping to change the coating mixture it is possible to apply thicker second and successive coats that will quickly give a film of the desired thickness that overlies the surface and does not materially impair the absorbency of the body portion of the base material. In order to accomplish this an extremely thin, first coat overlying the surface without depositing more than a very slight amount of coating material on the base (too little to do substantial injury or to have appreciable penetration of the base), the discharge opening for the coating material from the container 10 is made narrow and the fabric or other material is moved so rapidly across the opening that a coating material such as the semi-liquid viscous cellulose nitrate mixture or pyroxylin mixture described in said copending application will be spread or applied in such a thin film on the surface of the fabric and the solvent of the coating material will be evaporated so rapidly as to leave the coating material in the form of an extremely thin or diaphanous film which has practically no penetration of the fabric. Such an overlying, first film or layer is the foundation upon which I quickly build a second much thicker film if the work in hand requires it, or by repeated operations I may greatly increase the thickness to any desired requirement, all without appreciably affecting the absorbency of the base material. Since the finished, multiple-layer film is on the surface, the body portion of the base material is not appreciably affected and is in perfect condition to absorb anything required of it that it was able to absorb before it was coated as, for example, an ink supply for an ink transfer member of some certain kind or character made of any of the fibrous materials mentioned in said application and said base member will be able to meet the extremely exacting requirements for coated transfer members where the ink is forced through the ink-retarding film in printed impressions of type faces. For this unusually thin, slight, diaphanous first coating, above described, I may use a cellulose nitrate or other semi-liquid, or viscous coating material and form the film. By using a discharge opening of about one-eighth of an inch and moving the base material at the rate of several hundred feet per minute by means of the driven rolls shown in Fig. 1 as 14a; and moving the base as illustrated in said drawings through the apparatus as an uninterrupted, continuous operation at uniform speed, starting from the supply roll 13 and pulling or moving the base past the coating station and across the discharge opening and over and across the roll 14 and into and thru the drying and evaporation chamber 15 and thru said driven rolls 14a, and all at said speed of several hundred feet per minute. After thus applying this thin film or surface coating to the base, by a single passage of the base past the discharge opening of the container, and after thoroughly evaporating the solvent material in the said coating material, if any, and drying said coated base, it can then be passed through the apparatus again one or more times, as may be necessary to make the coating film of the desired thickness. The exceedingly thin slight diaphanous film or coating so rapidly and economically spread and placed upon and applied to the surface of the base material by its first passage through the apparatus will prevent the base, in the subsequent passages thereof through the apparatus from absorbing the coating material, and will prevent appreciable or material penetration of the base material by the coating material, and the discharge opening for the coating material can be widened or the speed of travel of the base reduced so as to augment or build up the coating to the desired thickness by only a second passage of the base through the apparatus. Of course the base material may be passed through the apparatus one or more times as may be necessary to secure the type and thickness of coating required in the preparation of any kind of coated absorbent base material, including the various kinds disclosed in the copending application, viz: paper, wool, linen, rag or wood pulp papers or other papers, artificial silk, and the materials above mentioned in this present application, or mixtures of any of the fibres of these materials or other materials not mentioned herein, with any other fibers desired. The base must be absorbent and free from substances that may materially impair its absorbency. Ink transfer members are freed of foreign substances before inking so as to make them highly absorbent. Each fabric may work differently, for example, as disclosed in my copending application, I may apply a substantial first coat of pyroxylin on a cotton base and then by a high temperature decompose said coating so that it practically disappears. This may be done at a temperature of 350 to 360 degrees F. by moving the base material at a speed of about 35 feet per minute through a drying zone. A chemical change of beneficial character takes place in the coating and when it has largely disappeared, the surface of the base material is admirably prepared for additional coats without appreciable penetration of the base material and without materially impairing the absorbency of the base. This particular cotton material so coated is for feeding ink through to a writing surface.

As stated in said copending application, the purpose for which the base material is intended will determine the number and thickness of the coats. As also disclosed therein, for an ordinary ink-retarding agent through which ink may be fed or forced upon a writing surface in printed impressions, I may use a pyroxylin mixture, one-half pyroxylin solution and one-half pyroxylin cement; the pyroxylin solution is composed of four parts of pyroxylin to five parts of a softener such as castor-oil, to which is added a low-boiling point solvent, which is ethyl acetate diluted with a quick drying liquid such as alcohol or gasoline or acetone. Pyroxylin cement is the same as pyroxylin with the softener omitted and gum added. The addition of gums or resins seems to give greater flexibility and adhesion. For the coated webs, sheets, and ribbons, of my copending application which are produced by this process herein described, I may add a final coating of gum on top of the pyroxylin or cellulose nitrate film to further strengthen the base material and further regulating and retarding the amount of ink which is forced through the coating or film by the type. I have discovered, as disclosed in said application, that after I have first coated the base with the coating materials described above, a final coat on the side next to the paper or writing surface may be applied directly over one or more coats of cellulose nitrate or pyroxylin or other suitable material after said coats have first been well dried. This final coating may be gum or glue or a glue-like gum. This final coating could not be used by applying it directly upon the base for the first coat because it would immediately penetrate and substantially saturate the base material and destroy a large part of its absorbency. To produce the absorbent textile and fibrous materials the coating materials must be of a semi-liquid material which can be applied with the apparatus described herein with the narrow discharge opening mentioned and at the speeds mentioned, and without appreciable penetration of the base material by the coating.

The discharge opening of the container can be selectively widened if desired, for the successive coats, after the first coat, in different ways, for instance, in the construction shown in Fig. 6, the bottom plate 17 of the container, which plate forms one edge of the discharge opening 11, can be adjusted away from the opposite edge of the discharge opening for widening the opening. The bottom plate 17 may be adjustably secured in place as by means of screws 18 screwed into the end walls of the container through elongated slots 19 in the upwardly projecting end flanges 20 of the bottom plate 17.

It will be understood that my hereindescribed apparatus can be employed for coating ribbons or bands or relatively wide webs or pieces which, after coating, can be cut into ribbons of desired widths; and also for simultaneously coating a plurality of narrow webs or ribbons arranged parallel edge to edge and passed simultaneously through the apparatus. When a plurality of narrow webs are simultaneously coated, the container may be divided by partitions into separate compartments each opposite one of the ribbons, or the container may be provided with a separate discharge opening for the coating material for each ribbon extending substantially from edge to edge of the ribbon.

When coating relatively wide webs, one or more supplemental scrapers or blades 16b are preferably employed in addition to the scraper 16. These supplemental scrapers may be arranged, as shown in Fig. 6, at the rear side of the container with reference to the direction of travel of the web, the supplemental scrapers being spaced apart and having thin scraping edges which bear upon the web. These scrapers 16b supplement the scraper 16 and insure the spreading of the coating material over the entire surface of the web or fabric and prevent possible uncoated streaks or bare spaces on the web.

The coating material is preferably maintained at a substantially constant level in the container 10 during the coating operation, for which purpose the coating material may be supplied to the container 10 from a reservoir or tank 21 provided with a discharge pipe 22 leading to the container 10 and provided with a suitable valve 23 for regulating the feed of the coating material to the container.

A suitable stirring or agitating device is preferably employed in the container 10. Any suitable stirrer or agitator for this purpose may be provided. As shown in Figs. 5 and 6, the stirrer consists of a rotary shaft 24 suitably journalled in the container and provided with a screw or helical blade 25, the stirrer being driven from an electric motor 26 mounted externally on the container and connected by a sprocket chain 27 and wheels to the stirrer shaft.

The container 10 shown in Figs. 4-6 is provided with a movable or hinged cover 30 adapted to be opened for access to the container for cleansing it and adjusting and removing the scraper 16. The cover shown is hinged at the rear edge of the container and adapted to be secured by hasps or fastening devices 31 of any suitable sort at its front edge. This hinged cover is also preferably provided with a hole or opening 32 equipped with a pivoted cover plate 33 which can be readily moved to permit the operator to fill the container or examine its contents without opening the main cover.

Also, the container 10 is preferably adjustably mounted so that it can be adjusted toward and from the web and so that it can be quickly and easily moved out of its operative position over the web or fabric when this is necessary, and quickly returned to its operative position. In the construction shown in Figs. 4-6, for this purpose, the container is provided at opposite ends with cross bars 34 which are pivoted as by screws 36 provided with wing nuts 37 on supporting bars 38, and at their opposite ends the cross bars are provided with studs 39 adapted to rest in open topped slots 40 in the supporting bars. The container can be swung to and from its operative position on the pivots 36 by using the studs 39 as handles, and when the container is returned to its normal position, the studs will seat in the open slots and constitute stops for holding the container in its normal position. By tightening the nuts 37, the container can be secured in the position to which it is moved. The supporting bars 38 are mounted on posts or uprights 41 rising from a base 42, the supporting bars being adjustable vertically on the posts 41 toward and from the base by nuts 41a screwed on the threaded upper ends of the posts and disposed above and below the lateral flanges of the angle supporting bars.

Figure 2:
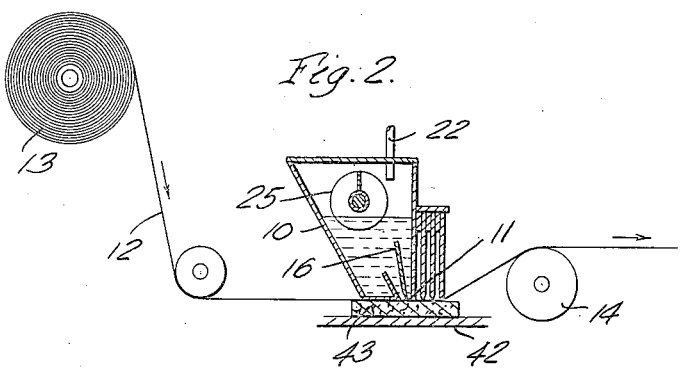
Figs. 2 and 3 are similar views showing two different modifications of means for holding the moving web against the discharge opening of the container for the coating material.

Fig. 2 shows a construction similar to that shown in Figs. 4 to 6, and above described, except that the web or fabric to be coated is held firmly up against the bottom of the container and against the edges of the scrapers by a pad 43 of felt or other suitable material mounted on the base 42 beneath the container. The adjustment of the supporting bars for the container vertically relatively to the base enables the container to be set so as to bear with the required pressure against the fabric supported by the underlying pad.

Figure 3:
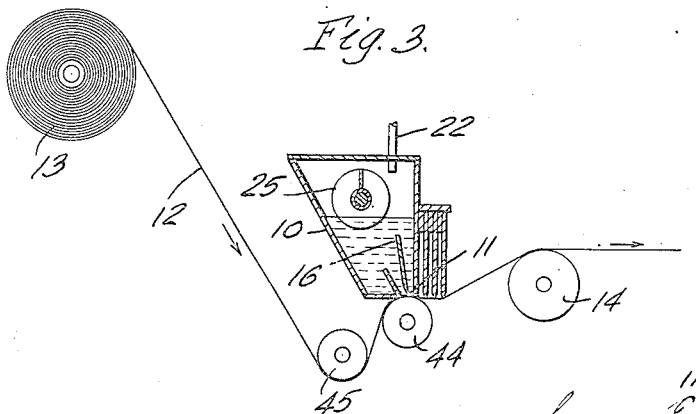

Fig. 3 shows another means for holding the web or fabric to be coated against the edges of the discharge opening 11 of the container and the edge of the scraper 16. In this construction, this is accomplished by a roller 44 journalled opposite the discharge opening of the container and over which the web or fabric passes and by which it is held against the scraper 16 and the edges of the discharge opening. In the arrangement shown in this Fig. 3, the web passes from the supply roll beneath a guide roll 45 and thence upwardly and over the pressure roller 44 to the other guide roller.

Figure 7:
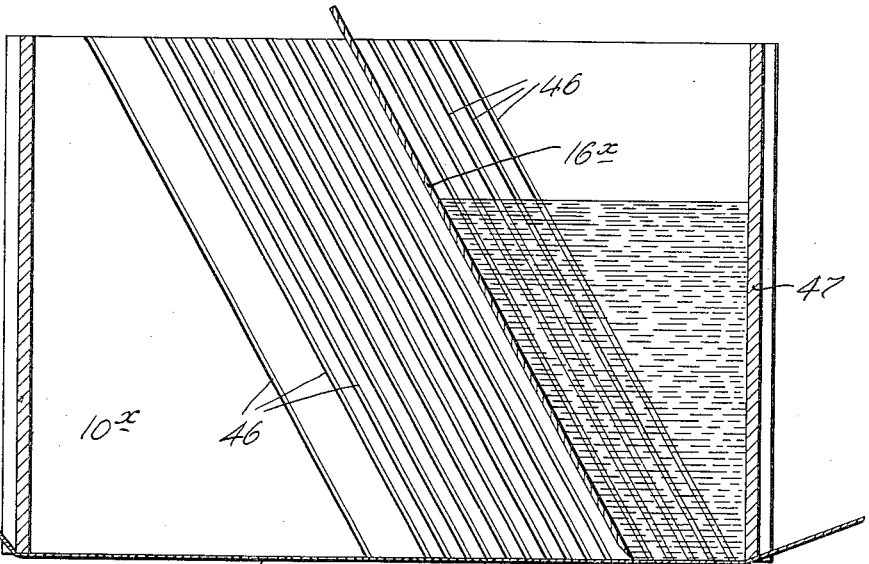
Figs. 7 and 8 are respectively a vertical, longitudinal section, and a plan view of a modified form of container for the coating material.
Figure 8:
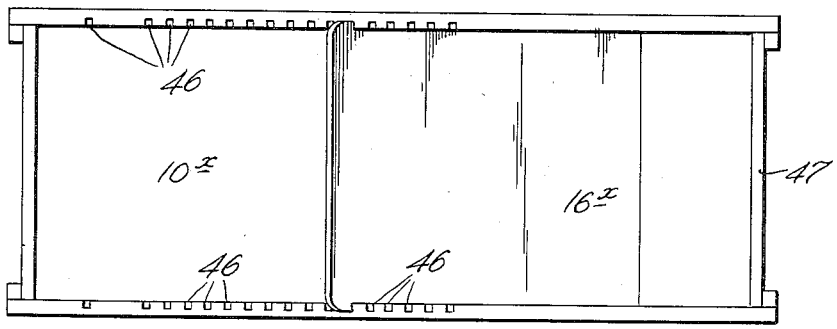

The variation in the width of the discharge opening of the container for the coating material can be accomplished in other ways than above described. For instance, as shown in Figs. 7 and 8, the container 10x is provided in the inner faces of its end walls with opposite registering inclined grooves 46 which incline downwardly toward the wall 47 of the container. If the scraper or blade, shown at 16x is placed in the first pair of grooves, its lower scraping edge will lie close to the opposite edge of the discharge opening formed by the wall 47 of the container and will form a narrow discharge slot or opening for the coating material which, in this construction is confined in the container between the blade and the wall 47 of the container. The blade can be adjusted to different desired distances from the wall 47 of the container to widen the discharge opening, as may be necessary, by placing the blade in one or another of the several pairs of holding grooves 46.

Figure 9:
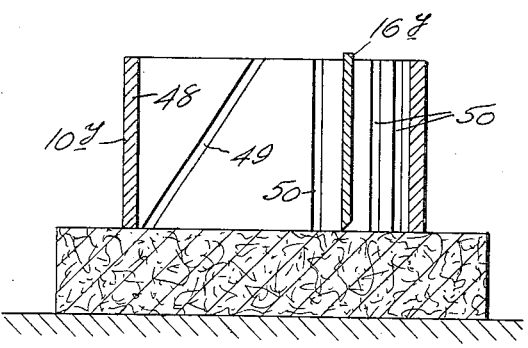
Fig. 9 is a vertical, longitudinal section of still another form of container.

Another arrangement for this purpose is shown in Fig. 9, in which, as in Fig. 7, the scraper 16y is adapted to be supported in different positions in the container 10 and nearer to or farther away from one wall 48 of the container. For instance, the scraper or blade can be held in the inclined grooves 49, or, as shown in said Figure 9, the blade can be removed from these grooves and secured in one or another of the several pairs of vertical grooves 50 shown in the end walls of the container 10y in this construction. While the method and apparatus disclosed are perfectly adapted for producing the coated base materials used, when inked, as inked papers, sheets, fabrics or other members, yet said method and apparatus are for other purposes wherever it is desirable to produce on the surface of absorbent base materials a surface coating or film which does not appreciably impair the absorbency of the body portion of the base material. The base material must be absorbent. It may be of any form or size, such, for example, as a continuous sheet or web, or it may be a whole textile fabric in the wide goods, or a single continuous ribbon, or a band or any desired form or size or shape of absorbent material and the coating material may be any suitable semi-liquid material which may be used to form a surface film which is a superficial, overlying film, and not an impregnating film which goes deep down into the body portion of the base material; and the base materials may be of any kind of absorbent fibres as set forth in detail in said copending application, including those not mentioned herein.

I claim as my invention:—

1. The method of applying a semi-liquid material to an ink absorbent fabric of the nature of ink receiving base material and an absorbent material used in preparing ink transfer members to form a surface coating thereon, comprising first moving the web rapidly past a confined body of the coating material which has a restricted area of contact with the surface of the web, promptly drying the coating material before it can materially penetrate the web fabric to form a thin coating film on the web and limit the penetration of the coating material into the fabric, and subsequently moving the web thus coated in contact with the coating material to augment the coating film.

2. The method of applying a semi-liquid material to an ink absorbent fabric of the nature of ink receiving base material and an absorbent material used in preparing ink transfer members to form a surface coating thereon, comprising first moving the web rapidly past a confined body of the coating material which has a restricted area of contact with the surface of the web, promptly drying the coating material before it can materially penetrate the web fabric to form a thin coating film on the web and limit the penetration of the coating material into the fabric and subsequently moving the web thus coated in contact with the coating material and causing the material to contact for a longer period of time with the surface coating of the web to augment the coating film.

3. The method of applying a semi-liquid material to an ink absorbent fabric of the nature of ink receiving base material and an absorbent material used in preparing ink transfer members to form a surface coating thereon, comprising first moving the web rapidly past a confined body of the coating material which has a restricted area of contact with the surface of the web, promptly drying the coating material before it can materially penetrate the web fabric to form a thin coating film on the web and limit the penetration of the coating material into the fabric and subsequently moving the web thus coated in contact with the coating material and causing a wider area of contact of the coating material with the surface coating on the web to augment the coating film.

4. The method of treating absorbent material which comprises placing an ink retarding quick-drying coating along one side of an uninked base material, rapidly drying said ink retarding quick-drying coating, both the application of the retarding coating and the rapid drying being in rapid succession and almost instantaneously with the result that the ink-retarding coating has practically no penetration of the absorbent base material and does not in any material degree impair its absorbing capacity, the finished base material being uninked.

5. The method of coating absorbent material to effect a surface film thereon, without material impregnation and without impairing the absorbency of the body portion of said base, but leaving same dry and absorbent and free from oil or other foreign substances, which comprises applying to a surface of said base material a quick-drying coating which adheres to said surface with immeasurably slight penetration and, therefore, affecting the absorbency of the body portion of the base material unappreciably, and then immediately subjecting the material to an elevated drying temperature.

6. The method of coating absorbent material to effect a thin, surface coating or film thereon, without material impregnation and without impairing the absorbency of the body portion of said base appreciably, which comprises applying to one surface of a rapidly moving web a quick-drying coating which adheres to said surface of said web with immeasurably slight penetration, and, therefore affecting the absorbent capacity of the material unappreciably, and then immediately subjecting the web to an elevated drying temperature.

7. The method of coating absorbent material to effect a thin, surface coating or film thereon, without material impregnation and without impairing the absorbency of the body portion of said base appreciably, which comprises applying to the surface of said absorbent base or web a semi-liquid solution of a coating material in a volatile solvent, which adheres to the surface of the base or web with immeasurably slight penetration, and, therefore, unappreciably affects the absorbent capacity of the base or web and then immediately, and as a very rapid operation, causing complete volatilization of the solvent of the coating material.

8. The method of coating absorbent material which comprises applying to the surface of a rapidly moving web or base of said material, a quick-drying coating material in a volatile solvent, which adheres to the surface of the web or base with immeasurably slight penetration and, therefore, unappreciably affects the absorbency of the body portion of said base and then rapidly drying the base.

9. The method of coating absorbent material to effect a thin, overlying, surface film thereon, without material impregnation and without appreciably impairing the absorbency of the body portion of said base material, which comprises moving said base rapidly in surface contact only with a narrow body of a quick-drying coating material which adheres to the surface of said base with immeasurably slight penetration and, therefore, unappreciably affecting the absorbent capacity of the body portion of said absorbent material, and immediately, and as a very rapid operation, subjecting the coated, absorbent material to an elevated drying temperature.

10. The method of coating absorbent material to effect a thin, overlying, surface film thereon, without material impregnation and without appreciably impairing the absorbency of the body portion of said base material, which comprises applying to one surface of said base material a quick-drying coating material which adheres to said surface with immeasurably slight penetration and, therefore, affecting the absorbent capacity of the material unappreciably, and then as a very rapid operation, drying said coated base and then repeating the operation and cohesively uniting a second coat to the first coat without affecting the absorbency of the body of the absorbent base material.

11. The method of coating absorbent base material according to claim 4, wherein the operation is repeated one or more times to effect a surface film of any required character and thickness.

12. The method of treating absorbent material without materially affecting the absorbency thereof, which comprises placing an extremely slight amount of a quick-drying coating material upon said base material and instantaneously spreading same into a superficial pellicle or exceedingly fine, thin film, and drying same so rapidly as to leave the quick-drying coating in the form of a superimposed surface film or veil which has practically no penetration of the base material.

13. The method of treating absorbent material without materially affecting the absorbency of the body portion of the base, and so as to avoid appreciable impregnation of said body portion, and so as to leave the absorbent material dry, and the body portion free from foreign substances which might materially injure or impair its absorbency, which comprises moving said base in surface contact only with a narrow body of quick-drying coating material, in a volatile solvent, so that a slight amount of said coating material adheres to the said surface and then, as a very rapid, successive operation, almost instantaneously, evaporating the solvent of the quick-drying coating material, and thoroughly drying said coated base, and leaving the quick-drying coating material in the form of a superimposed, superficial film which has practically no penetration of said base material.

14. The method of treating absorbent material according to claim 12 wherein the operation is repeated a sufficient number of times to secure a coating or film of any required thickness.

15. The method of treating absorbent material so as to effect a thin surface coating thereof, which comprises rapidly carrying out the following steps: (a) feeding the material in a continuous web at a relatively high rate of speed and contacting it with a narrow body of quick-drying coating material, in a volatile solvent, which adheres to the surface of the absorbent base material without appreciable penetration and without materially impairing the absorbent character of the absorbent base material, and (b) feeding the absorbent base material so coated, into and through a heating and drying and evaporating zone.

16. The method of treating absorbent material which comprises carrying out the following steps in rapid succession; (a) applying to a surface of said absorbent base material a quick-drying coating material in a slight amount, spreading same instantaneously over the said absorbent base material with immeasurably slight penetration of the body portion of said absorbent base material, and (b) very rapidly and almost instantaneously drying said coated absorbent material by passing the same through heat.

17. The method of coating absorbent material so as to effect a thin, superimposed, superficial, overlying surface film thereon, without material penetration of the body portion of the base and without material impairment of the absorbent capacity thereof, leaving said body portion free of foreign substances, and dry, which comprises laying a quick-drying coating material in the form of an extremely thin layer upon the surface of said base portion and almost instantly evaporating the solvent material of the coating material, by subjecting the coated absorbent base material to an elevated drying temperature.

18. The method of coating absorbent material without materially affecting the absorbency of the body portion thereof, leaving the body portion absorbent and free from foreign substances, and dry, which comprises applying a solution, in a thick state or a viscous, semi-liquid state, of a coating material, to a surface of said absorbent material, and almost instantaneously evaporating the solvent of said semi-liquid coating material by subjecting the coated absorbent base material to an elevated temperature.

19. The method of coating absorbent material without materially affecting the absorbency of the body portion thereof, leaving the body portion absorbent and free from foreign substances, and dry, which comprises feeding the material in a continuous web at a high rate of speed past successive and closely adjacent coating stations, applying a quick-drying coating material in a thin film to a surface of said web at the first station and subjecting the coated web to an elevated temperature at the other station.

20. The method of coating absorbent material as in claim 5, wherein said quick-drying coating material is applied at a speed of several hundred feet per minute and wherein the coating and drying operations are both done at high speed with one continuous, uninterrupted movement of the travel of said absorbent material past the coating station and into and through the drying zone; the operations being done in very rapid succession.

21. In the manufacture of ink-receiving base portions of ink transfer members, using highly absorbent materials, the step which comprises applying to a base material substantially free from oil, gum, or other foreign substances which might adversely affect its absorbency, an ink-retarding film, said film being an overlying, superficial, superimposed, surface film, and thereby effecting no impairment of the normal absorbing capacity of the ink-receiving base portion of the ink transfer member.

22. In the manufacture of ink-receiving base portions of ink transfer members, using highly absorbent materials, the two steps in very rapid succession, which comprise: (a) applying to one surface of said base a thin film of a semi-liquid coating material in a volatile solvent, and (b) subjecting the said coated base to an elevated temperature to effect a substantially instantaneous volatilization of the solvent of said coating material, and thereby to effect a superficial, superimposed, layer or film on said base having no material impairing effect upon the absorption capacity of said ink-receiving base.

23. The method of coating absorbent materials without materially impairing or reducing their absorption capacity, which comprises the step of drying said coated absorbent material following the application of the coating, at a rate so rapid as to prevent any appreciable absorption of said coating material by said absorbent material.

24. The method of coating absorbent material without appreciably impairing its absorbency, which comprises feeding the material in a continuous web at a high rate of speed past successive stations, at which stations respectively the said web has deposited thereon a slight amount of a semi-liquid coating material and subjecting said web to spreading operation quickly spreading said coating material out into an exceedingly thin layer, and almost instantaneously drying said coated web, by subjecting same to an elevated temperature.

25. The method of treating absorbent material without materially affecting the absorbency thereof, according to claim 12, wherein the amount of the quick-drying material laid and spread upon the top of the first coating, or preceding coating, is increased for one or more operations, drying the coated base material thoroughly and so rapidly after each application of the coating material that no penetration of the body portion of the base can occur, and continuing the operations until a coating or film of the desired character is attained, all without impairing appreciably the absorption capacity of the base material, the same character of quick-drying coating material being used for the first coat and all successive coats.

26. The method of treating fibrous material to effect a thin, surface film thereon, without material impregnation, and without impairing the absorbency of the body portion of said fibrous material, which comprises in rapid succession, applying to a surface of an absorbent web of fibrous material a semi-liquid solution of a cellulose-nitrate compound, removing the surplus by suitable means, and subjecting the coated fibrous web to an elevated temperature to effect almost instantaneous evaporation of the solvent of the coating material, the said web moving continuously at high speed during the two successive operations.

27. The method of treating absorbent base materials, without material impregnation and without appreciably impairing their absorbency, leaving them dry and highly absorbent, which comprises applying to a continuous absorbent web material, substantially free from oils or gums or other foreign substances which would injure its absorbency, an ink-retarding coating or film, said film being in such a slight amount and spread so exceedingly thin over the entire area of the web, and dried so rapidly, as to form a superficial, overlying, superimposed film on the surface of said absorbent base material, without appreciable impairment of the absorption capacity of said base material.

28. The method according to claim 27, wherein the coating material used is a pyroxylin mixture, suitable for use in forming a film through which the ink of an ink-receiving base of an ink transfer member may be forced by the impact or force of the type in the operation of a typewriter or other printing mechanism.

29. The method according to claim 27, wherein said coating material is a cellulose-nitrate material comprising a mixture of pyroxylin cement and pyroxylin solution, half of each, the pyroxylin solution comprising four parts of pyroxylin to five parts of castor oil or other suitable softener, including ethyl acetate diluted with a quick-drying liquid.

30. The method of treating absorbent fibrous materials, including paper, according to claim 26, in which the coating operation is repeated with a wider discharge opening and with a larger amount of coating material being applied for the second and successive coats, and drying same thoroughly and rapidly after each application of the coating material before appreciable impairment of the absorbency of the body portion of the said fibrous material, until a film of the required character and thickness is attained.

31. The process of coating absorbent, uncoated and unfilled woven or paper fabrics, which comprises providing the absorbent, uncoated and unfilled fabric with a thin, diaphanous, substantially non-penetrating, non-impregnating coating, and then applying additional coats as desired.

32. The process of coating absorbent, uncoated and unfilled woven or paper fabrics, which includes, as a preliminary step, the application to the absorbent, uncoated and unfilled fabric of a thin, diaphanous, substantially non-penetrating, non-impregnating coating.

33. In the process of coating absorbent, uncoated, unfilled, woven or paper fabrics, the steps which comprise rapidly and uniformly coating the absorbent, uncoated and unfilled fabric with an extremely thin, superficial layer of coating material to effect a film of diaphanous character, and under conditions preventing impregnation of the fabric by the coating material, and rapidly drying the fabric so treated before any substantial penetration can occur, whereby the fabric is provided with a thin diaphanous coating overlying one surface upon which subsequent coatings of any desired thickness and character can be applied without substantial penetration or impregnation of the fabric thereby.

34. The method of coating absorbent, uncoated and unfilled woven or paper fabrics without substantial penetration or impregnation of the fabric by the coating material, which comprises first providing the absorbent, uncoated and unfilled fabric with an extremely thin, diaphanous, non-penetrating coating of the coating material, whereby said coating prevents appreciable impregnation of the fabric upon the application of subsequent coats, and then coating the material as many times as necessary; the finished, coated material carrying a coating of the desired thickness but the fabric retaining its absorbency and being free of coating material down in the substance of the body portion of the fabric itself; said coating, regardless of its thickness, being a superficial, overlying, surface coating only.

35. A base for preparing coated fabrics of woven or paper material, comprising an absorbent, unfilled fabric, having a thin diaphanous, superficial, overlying, surface coating thereon, to prevent coating material applied thereon as a second or further coating from penetrating, from saturating and from impregnating any portion of the absorbent body portion of said fabric.

36. A woven base for preparing a coated fabric, comprising an absorbent, unfilled fabric, free from oil or gum or other foreign material, having a thin, diaphanous coating overlying one surface of said fabric to prevent coating material applied thereon as a second or further coating from penetrating into said absorbent fabric, thereby reducing the absorbency of the body portion of said fabric.

37. A coated fabric comprising an absorbent, unfilled fabric having a thin, diaphanous, superficial coating overlying one surface to prevent coating material subsequently applied thereon from reducing the absorbent capacity of the body portion of said fabric.

38. An ink-receiving base for use in making ink transfer members, comprising a woven, absorbent, cotton fabric, of such character as is suitable for use in making ink receiving bases of ink transfer members, said fabric carrying a thin, non-saturating, and non-impregnating coating which does not appreciably reduce the absorptive capacity of the body portion of the said coated fabric and the coated fabric can absorb large quantities of ink in the usual operation of supplying uncoated fabrics with ink.

39. An ink-receiving base as in claim 38, wherein the coating is pervious to ink.

40. An ink-receiving base as in claim 38, wherein the coating comprises nitro-cellulose.

41. An ink-receiving base as in claim 38, wherein the coating is diaphanous.

42. An ink-receiving base as in claim 38, wherein the coating comprises nitro-cellulose and is diaphanous.

GEORGE E. PELTON.